United States Patent [19]

Kuratomi et al.

[11] Patent Number: 5,511,134
[45] Date of Patent: Apr. 23, 1996

[54] IMAGE RECOGNITION DEVICE AND IMAGE RECOGNITION METHOD

[75] Inventors: Yasunori Kuratomi, Suita; Hisahito Ogawa, Nara, both of Japan

[73] Assignee: Matsushita Electric Industrial Co., Ltd., Osaka, Japan

[21] Appl. No.: 875,086

[22] Filed: Apr. 28, 1992

[30] Foreign Application Priority Data

May 1, 1991 [JP] Japan .................................. 3-100036
Oct. 2, 1991 [JP] Japan .................................. 3-255027

[51] Int. Cl.$^6$ ............................................. G06K 9/62
[52] U.S. Cl. ......................... 382/158; 382/203; 382/205
[58] Field of Search .............................. 382/14, 15, 22, 382/25, 156, 158, 203; 395/21, 22, 23, 27

[56] References Cited

U.S. PATENT DOCUMENTS

| | | | |
|---|---|---|---|
| 4,805,225 | 2/1989 | Clark | 382/15 |
| 5,040,230 | 8/1991 | Takatori et al. | 382/15 |
| 5,046,019 | 9/1991 | Basehore | 395/27 |
| 5,111,516 | 5/1992 | Nakano et al. | 382/14 |
| 5,153,923 | 10/1992 | Matsuba et al. | 382/14 |

OTHER PUBLICATIONS

Wasserman, "What are they and why is everybody so interested . . ." Spring 88, pp. 10–15.
Berkan et al, "Concept of Learning Equilibrium Dynamics . . ." Jul. 9, 1990, pp. 920–924.
T. Morita and K. Fuji, "Recognition System for Handwritten Letters Simulating Visual Nervous System", *Electronics and Communications in Japan*, vol. 52-C, No. 7, pp. 100–108 (1969).
T. A. Jamison and R. J. Schalkoff, "Feature Extraction and Shape Classification of 2-D Polygons Using a Neural Network", *Proceedings of the Southeastcon*, vol. 3 of 3, pp. 953–958 (1989).
X. Zhu et al., "Handwritten Character Recognition by a Layered Neural Network", *Systems and Computers in Japan*, vol. 21, No. 13, pp. 88–97 (1990).
K. Fukushima et al., "Neocognitron: A New Algorithm for Pattern Recognition Tolerant of Deformations and Shifts in Position", *Pattern Recognition*, vol. 15, No. 6, pp. 455–469 (1982).
"Orig. Cont—Neocognition: A Hierarchial Neural Network Cap. Of Visual Pattern Recognition" by K. Fukushima *Neural Networks*, vol. 1, pp. 119–131 (1988).
"Optical Neurochip based on a 3 Layered feed forward model" by J. Ohta et al. *Optical Letters*, vol. 15, No. 23, pp. 1362–1364 (Dec. 1, 1990).
"Proposal of a quantized learning rule and its application to optical neural network for 26 char.–alpha recognition", by M. Takahashi et al. pp. 321–322.
"GaAs/AlGaAs Optical Neurochip (Second Report)" by Y. Nitta et al. copied from *Conference Record of 1990 International Topical Meeting on Optical Computing* pp. 319–320.
Masatoshi Ishikawa, et al., "Optical association: a simple model for optical associtive memory", *Applied Optics*, vol. 28, No. 2, pp. 291–301 (Jan. 15, 1989).

*Primary Examiner*—Leo Boudreau
*Assistant Examiner*—Chris Kelley
*Attorney, Agent, or Firm*—Ratner & Prestia

[57] ABSTRACT

A two-dimensional bit image generated by the input device is processed by a four-layer neural network and recognized. The neurons in the second layer are connected only to the neurons of the first layer aligned in a specific direction, thereby enabling the second layer to extract line components in specific directions. The second layer is further divided into plural regions, and all neurons in each region are connected to one corresponding neuron in the third layer. The output of the third layer neurons thus express the position and degree of the extracted line component in the image. All of the neurons in the third layer are connected to all of the neurons in the fourth layer, and image recognition is possible by learning.

14 Claims, 16 Drawing Sheets

IMAGE RECOGNITION DEVICE AND IMAGE RECOGNITION METHOD

BACKGROUND OF THE INVENTION

1. Field of the Invention

The present invention relates to an image recognition device that recognizes images using a neural network comprised to simulate the cerebral nerve system of man and a similar input/output operation.

2. Prior Art

Recognition devices using a neural network have been developed and made commercially available for various applications, one of the most common being optical character recognition (see "Optical neurochip based on a three-layered feed-forward model" by Ohta et al. in Optics Letters, Vol. 15, No. 23, pp. 1362–1363, Dec. 1, 1990, or "Handwritten kanji character recognition using a PDP model" by Mori, Yokozawa, Umeda in Technical Research Reports of the Association of Electronic Communications Engineers, MBE87-156, pp. 407–414 (1988)).

FIG. 11 shows a block diagram of a prior art character recognition device that uses a neural network. The character input means 1 photoelectrically converts the image pattern of the character to the character data, which then outputs to the recognition means 2. This character data is a two-dimensional bit image such as that shown in FIG. 12. The recognition means 2 then applies the neural network to recognize the character. The recognition means 2 then outputs the recognition result to the storage means 3 or to a display device 4.

The operation of the neural network used by the recognition means 2 is described below referring to FIG. 13. The character data 5 generated by the character input means 1 is first input to the corresponding neurons 7 comprising the input layer 6. The character data received by each of the neurons 7 is then sent by each neuron 7 to all of the neurons comprising the hidden layer 9 through pathways 8 called synapses. It is important to note that the character data sent over the synapses 8 is weighted before it is input to the neurons 10 of the hidden layer 9. The weighting value is called the "synapse weight." The neurons 10 of the hidden-layer 9 calculate the sum of all input data, and output the result which is obtained by applying a non-linear function to this sum. These output results weighted with the synapse weight of the synapses 11 are input to all neurons 13 of the output layer 12. The neurons 13 of the output layer 12 similarly calculate the sum of all input data, and output the result of a calculation applying a non-linear function to the sum to the maximum value detection means 14. The maximum value detection means 14 obtains the maximum value of all inputs from the output layer 12 neurons, and outputs the character corresponding to the neuron that output the maximum value as the recognition result to either the storage means 3 or display device 4.

The synapse weights used in the above process are determined by learning called back error propagation. The learning is continued to correct the synapse weight until the desired output result is obtained. The neural network is trained in several different styles and fonts to further improve the recognition rate.

Feature extraction is important process whereby the feature needed to recognize an image is obtained. The features are the reference for character recognition. Therefore, the recognition performance of the neural network depends on the quality of the features.

Conventionally applied neural networks simply use the mesh features (binary pattern) of the character data generated by the character input means. Essentially what this process does is to recognize characters by the feature denoting which parts of the image are black and which are white in the character data. If the shape and size of the characters differs, as with handwritten characters, from the characters used to train the neural network, however, the recognition rate drops significantly. To improve the recognition rate, the neural network must be learned with several dozen different fonts and styles of characters. Hence, the learning process is extremely time-consuming, and the recognition rate of the neural network is still less than 90% even when the application is limited to recognizing printed matter.

For the extraction of the line components and other features requires, the input image should be converted to electrical image and stored in an image memory and processed by the computer. Such processing is time-consuming, and the construction of the recognition system is complex. There are same problems in the recognition of non-textual two-dimensional images.

SUMMARY OF THE INVENTION

Therefore, an object of the present invention is to provide an image recognition device based on a neural network capable of high speed learning, providing excellent recognition performance, and having a simple construction.

To achieve this object the image recognition device comprises an input means for inputting the image, and a recognition means for processing and recognizing the input image by means of a neural network. The neural network comprises plural neuron layers, each layer being a two-dimensional array of neurons. The neurons of the first layer receive the input image generated by the input means. The second layer are divided into plural regions, and neurons in the second layer are designed to extract the line components in a specific direction included in the input image by connecting with neurons of the first layer that are aligned in that specific direction. The neurons of the third layer extract the length of the line components by connecting with all neurons in a given neuron region of the second layer, and each of the neurons in the third layer is connected to all neurons in the fourth layer.

The second embodiment of the present invention is characterized by extracting specific geometric shapes composing the input image by connecting the neurons of the second layer with the neurons located in specific geometric shapes in the first layer.

For simplicity, the operation of the invention is described below as applied to character recognition. The character recognition rate can be improved by using features which are invariable with respect to various deformations of character. Thus, from the character data generated by the input means, the neural network of the first embodiment of the invention extracts three features, specifically:

(1) information on the orientation of a line component included in a pattern, whether it is a vertical, horizontal, left oblique (left-descending slope "/"), or right oblique (right-descending slope "\") line component;

(2) information on the length of the line component; and (3) information of the location of the line component.

A character is recognized on the basis of these features orientation position and length of the line components included in the pattern. Such features are hardly affected by the deformation of the patterns. This neural network thus achieves a high character recognition rate even with handwritten characters because it recognizes the characters using these three features.

Furthermore, the second embodiment of the present invention also achieves a high recognition rate with kanji characters and other complex images because it uses the various geometric shapes forming the characters as the feature quantities. Examples of these geometric shapes are "+", "⌐", "⊥", "Λ", etc.

The method for extracting these three features by the neural network is described. The extraction of a vertical line component is given as an example.

It is assumed that the matrix size of the second layer is the same as that of the first layer. The outputs from neurons located at i-th row and j-th column in the first and second layers are expressed $x^1_{i,j}$, $x^2_{i,j}$, respectively, where i is the number of the neuron from the top, j is the number of the neuron from the left, and the superscript number indicates the layer. Each neuron in the second layer is connected to the corresponding neuron in the first layer (i.e., the coordinates of the neurons are the same) and to the vertically adjacent neurons (condition 1) Therefore, $x^2_{i,j}$ can be expressed by equation 1 (condition 2):

$$x^2_{i,j} = f(wx^1_{i+1,j} + 2wx^1_{i,j} + wx^1_{i-1,j}) \tag{1}$$

where f(·) is an output function and w and 2w (w>0) are the synapse weight. The output function f is defined by equation 2 (condition 3).

$$f(x)=0 \quad (0 \leq x \leq 3w)$$

$$f(x)=x-2w \quad (x \geq 3w) \tag{2}$$

If there is a vertical line component in the input image, the neurons aligned continuously in the vertical direction in the first layer fire (e.g., $x^1_{i+1,j} = x^1_{i,j} = x^1_{i-1,j} = 1$).

By setting above three conditions 1–3, the neurons in the second layer fire only when the corresponding neurons of the first layer form a vertical line components.

The same principle can be applied to the extraction of horizontal and diagonal line component. The horizontal line component can be extracted by connecting a neuron in the second layer to a corresponding neuron in the first layer and also to neurons located on the left and right sides of the corresponding neuron. The input signal to the second layer neurons can be expressed by equation 3:

$$x^2_{i,j} = f(wx^1_{i,j-1} + 2wx^1_{i,j} + wx^1_{i,j+1}) \tag{3}$$

Equations 4 and 5 express the connections for the extraction of left-descending and right-descending diagonal lines, respectively.

$$x^2_{i,j} = f(wx^1_{i+1,j-1} + 2wx^1_{i,j} + wx^1_{i-1,j+1}) \tag{4}$$

$$x^2_{i,j} = f(wx^1_{i-1,j-1} + 2wx^1_{i,j} + wx^1_{i+1,j+1}) \tag{5}$$

On the basis of this method, line components in all four directions can be simultaneously extracted by preparing four sections in the second layer, each section having a matrix size which is the same as that in the first layer, and assigning a specific line component to each section.

This configuration makes it possible to also extract specific geometric shapes by defining a mathematical algorithm for each specific shape. For example, the shape "Λ" can be extracted from the neuron connections defined by equation 6.

$$x^2_{i,j} = f(wx^1_{i+1,j-1}/2 + 2wx^1_{i,j} + wx^1_{i+1,j+1}/2) \tag{6}$$

Other shapes, such as "+", "⌐", "⊥", can be similarly extracted.

The second layer is further divided into plural areas and each of these areas is assigned to a specific neuron in the third layer to extract the length (quantity) and position of the line components (geometric shape) extracted by the process up to the second layer. For example, each of the areas corresponding to a line component in the second layer may be divided into nine areas, and all of the neurons in the same area on the second layer is connected to the same one neuron in the third layer. The sum of the input signals to the neurons of the third layer will therefore correspond to the length of the line component, or the number of the geometric shapes, and the output from the neurons of the third layer therefore expresses existing position and/or degree of the extracted line component or geometric shape in the input image.

By thus assigning each of the nine neurons in the third layer to each of four line components, e.g., vertical, horizontal, left-oblique and right-oblique lines, the resulting 36 neuron outputs will express the corresponding features. For character recognition, these 36 neurons can be connected to all neurons in the fourth layer, and the connection load of the third and fourth layers can be determined by learning.

As thus described above, a neural network according to the present invention can extract features that are hardly affected by the deformation of character with device of simple construction. As a result, the present invention can recognize even handwritten characters with a high recognition rate. Learning is also completed more quickly because only several character types need to be used for learning. Note that the same recognition results can be obtained in the recognition of two-dimensional images.

BRIEF DESCRIPTION OF THE DRAWINGS

The present invention will become more fully understood from the detailed description given below and the accompanying diagrams wherein.

DESCRIPTION OF PREFERRED EMBODIMENTS

First Embodiment

Figure 1:
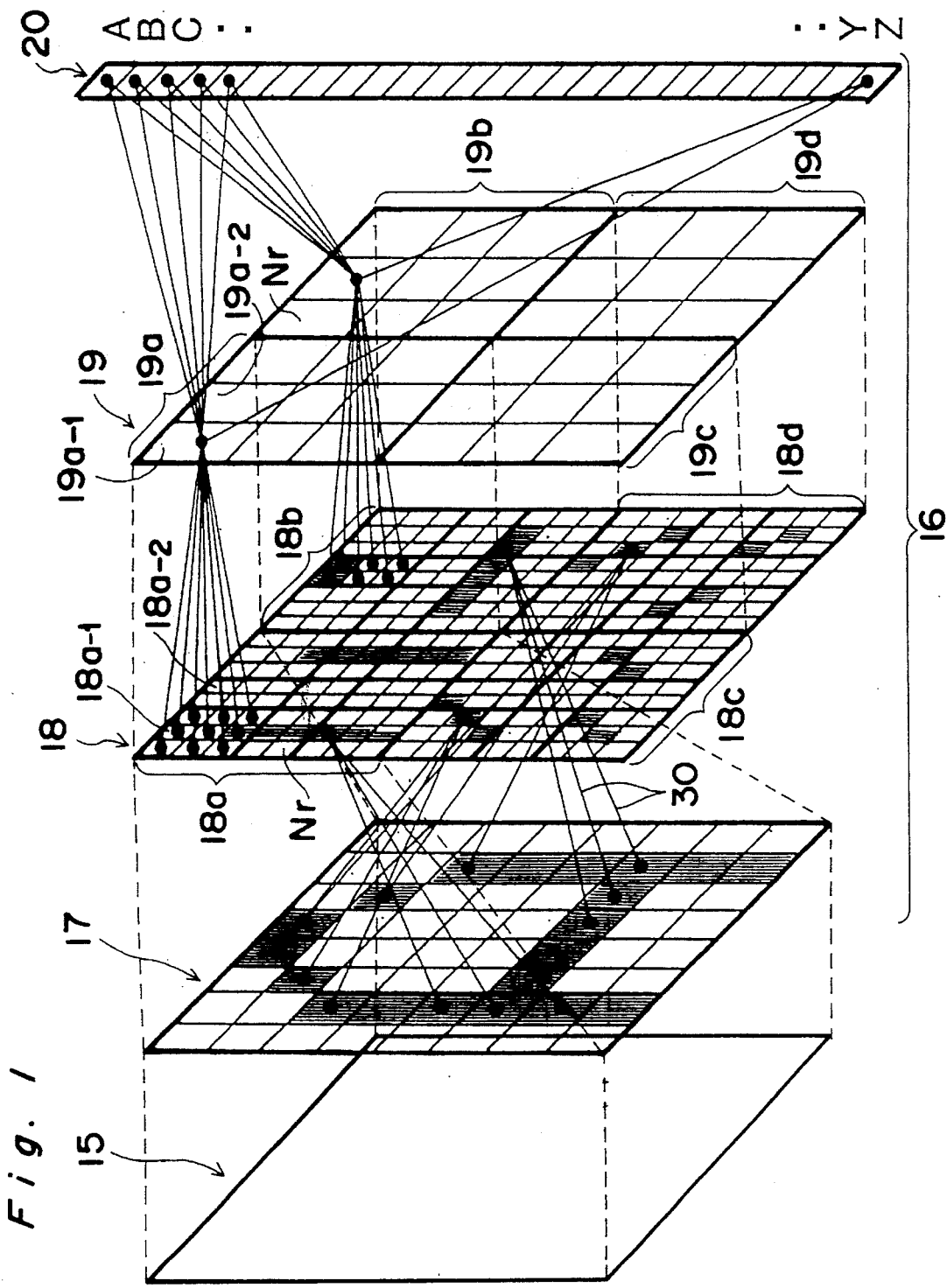
FIG. 1 is a diagrammatic view of the construction of an image recognition device according to a first preferred embodiment of the present invention.

Referring to FIG. 1, an image recognition device according to a first embodiment is shown. The image recognition device comprises an input device 15 and a neural network system 16. An image is input to the input device 15, which converts the image to the input data required for image recognition. The neural network system 16 for recognizing the input data comprises four layers, identified as the first, second, third, and fourth layers 17, 18, 19, and 20, respectively.

Figure 2:
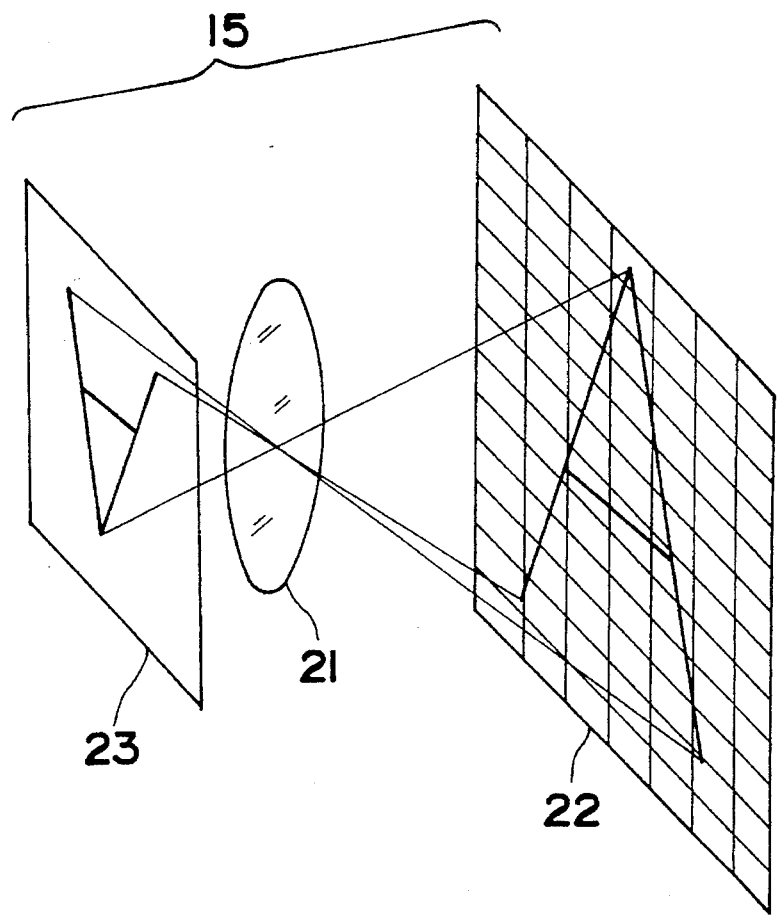
FIG. 2 is a diagrammatic view of an input device used in the first and second preferred embodiments.

As shown in FIG. 2, the input device 15 comprises a lens 21 and a receptor 22. An image of a character on an input medium 23, such as paper, is formed on the receptor 22 by the lens 21. The receptor 22 is divided into plural areas. Each of these areas functions to output a signal to the first layer 17 when the amount of light intensity of the area exceeds a predetermined threshold level. The receptor 22 shown by way of illustration in this embodiment is divided into 64 areas in an 8×8 matrix.

Figure 3A:
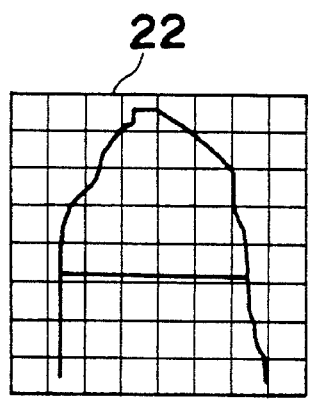
FIGS. 3a and 3b are diagrams showing a handwritten image and the conversion pattern of the input signal according to the first and second embodiments of the present invention.
Figure 3B:
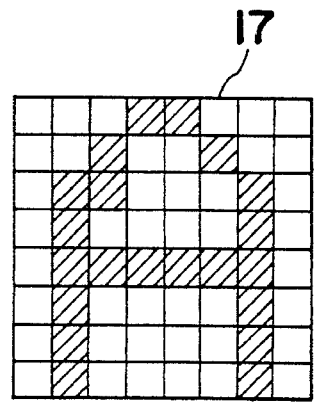

As shown in FIG. 3a, when a character pattern is input to a receptor 22, each region of the receptor 22 applies threshold processing to the sum of the light intensity, and the receptor 22 sends the image pattern, as shown in FIG. 3b, to the first layer 17, in which the black portion receives "1" and the white portion receives "0".

It is to be noted that the number of divided regions of the receptor 22 can be adjusted according to the images to be recognized. It is therefore possible to recognize complex input data such as a person's face by increasing the number of regions. For the purpose of the recognition of the handwritten alphabetic characters, the receptor 22 according to the first embodiment is divided into 64 (8×8) areas. Similarly, the first layer 17 as shown in FIG. 3b is divided into 64 (8×8) areas, each area carrying a neuron. A neuron at a black area produces "1" and a neuron at a white area produces "0".

Referring back to FIG. 1, according to the first embodiment, the second layer 18 is defined by a plurality of neurons Nr aligned in two orthogonal directions. In the example shown, there are 256 neurons Nr, 16 neurons aligned horizontally, and 16 neurons aligned vertically.

The second layer 18 is divided into four sections 18a, 18b, 18c and 18d, each of which has 64 neurons in a two-dimensional array of 8×8, corresponding to 8×8 areas in the first layer 17. When an image, such as "A" as shown in FIG. 1, is formed on the first layer 17, each section receives the entire image on the first layer 17 and senses particular lines on the layer 17.

The first section 18a is sensitive to a vertical line component, the second section 18b is sensitive to a horizontal line component, the third section 18c is sensitive to a left oblique (left-descending slope) line component, and the fourth section 18d is sensitive to a right oblique (right-descending slope) line component. Therefore, for example, a first neuron at the top left corner of the first layer 17 corresponds to four neurons in the second layer 18, i.e., a neuron at the top left corner of the first section 18a, a neuron at the top left corner of the first section 18b, a neuron at the top left corner of the first section 18c, and a neuron at the top left corner of the first section 18d. A further detail of each section is described below.

Figure 4A:
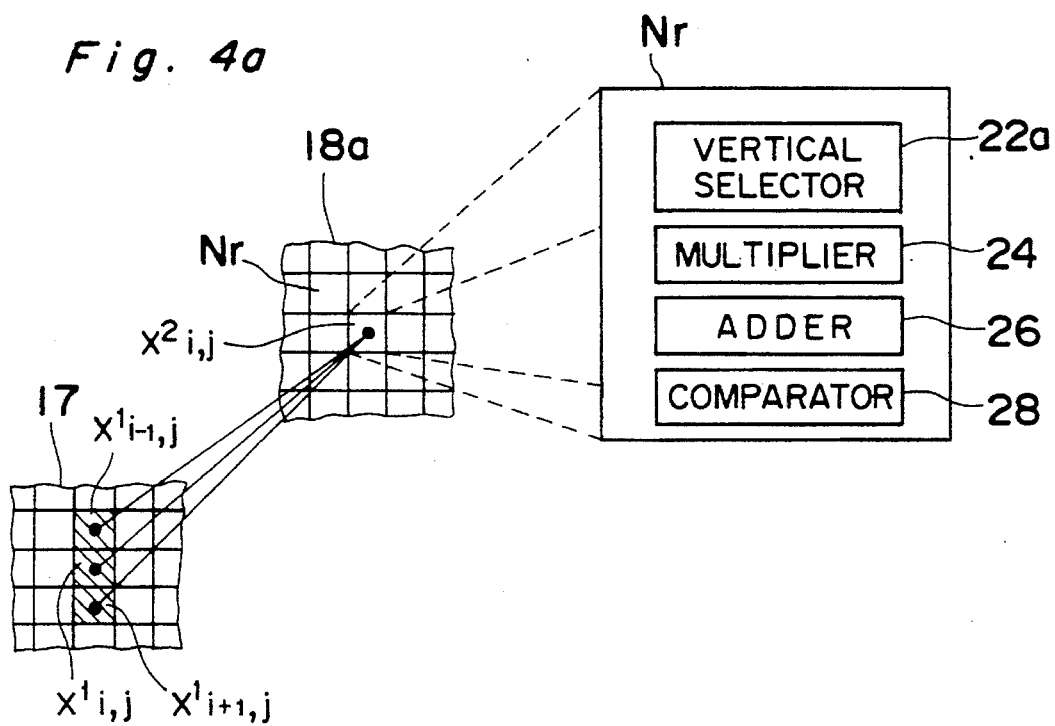
FIGS. 4a–4d are diagrams each showing a portion of the first and second layers and the structure of each neuron in the second layer, according to the first embodiment.

Referring to FIG. 4a, a portion of the first section 18a and a corresponding portion in the first layer 17 are shown.

The location of a neuron in one of the sections 18a, 18b, 18c and 18d, and the location of a neuron in the first layer 17, are indicated as (i,j) wherein i is the number of the neuron from the top, j is the number of the neuron from the left. The output data from a neuron at (i,j) in the first layer is indicated as $x^1_{i,j}$, and the output data from a neuron at (i,j) in one section in the second layer is indicated as $x^2_{i,j}$, wherein the superscript number indicates the layer.

Each neuron Nr in the first section 18a has a vertical selector 22a, a multiplier 24, an adder 26 and a comparator 28. The vertical selector 22a selects three data from the first layer 17 which are: the data $x^1_{i,j}$ from the corresponding neuron (i,j) in the first layer 17; the data $x^1_{i-1,j}$ from the neuron (i−1,j) above the corresponding neuron; and the data $x^1_{i+1,j}$ from the neuron (i+1,j) below the corresponding neuron. In other words, the vertical selector 22a selects three data from vertically aligned three neurons in the first layer 17. The first data $x^1_{i,j}$ is referred to as a direct data, and the second and third data $x^1_{i-1,j}$ and $x^1_{i+1,j}$ are referred to as adjacent data.

The multiplier 24 multiplies the direct data with a predetermined synapse weight 2w, and each adjacent data with a predetermined synapse weight w.

The adder 26 adds the multiplied results to obtain a sum $X_{i,j}$:

$$X_{i,j} = wx^1_{i+1,j} + 2wx^1_{i,j} + wx^1_{i-1,j}. \quad (1)$$

The data obtained by the equation (1) is compared with a predetermined threshold in a comparator 28 so that the data is produced from the neuron only when the data is greater than the predetermined threshold. If the threshold is defined as 3w, the comparison carried out in comparator 28 can be expressed by the following function:

$$f(X_{i,j}) = 0 \quad (0 \leq X_{i,j} < 3w)$$

$$f(X_{i,j}) = wx^1_{i+1,j} + 2wx^1_{i,j} + wx^1_{i-1,j} \quad (X_{i,j} \geq 3w)$$

Hence, the output data $x^2_{i,j}$ from a neuron at (i, j) in the first section 18a in the second layer 18 is given by:

$$x^2_{i,j} = f(wx^1_{i+1,j} + 2wx^1_{i,j} + wx^1_{i-1,j}) \quad (2)$$

Figure 4B:
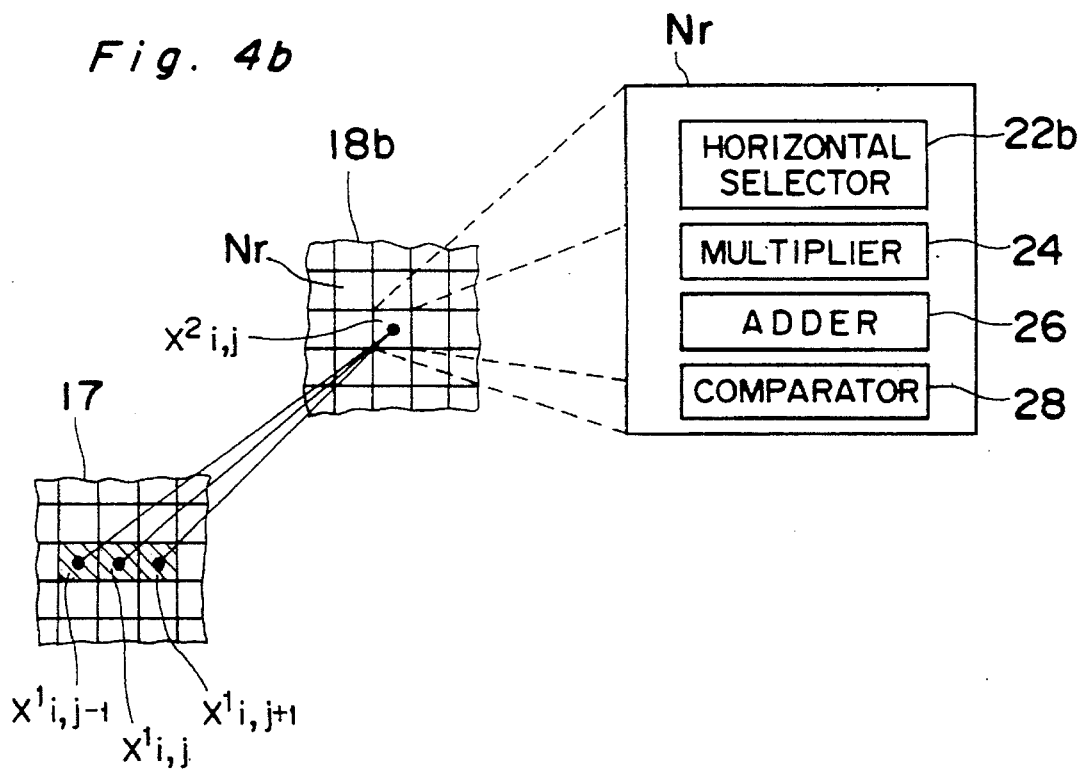

Referring to FIG. 4b, a portion of the second section 18b and a corresponding portion in the first layer 17 are shown.

Each neuron Nr in the second section 18b has a horizontal selector 22b, a multiplier 24, an adder 26 and a comparator 28. The horizontal selector 22b selects three data from the first layer 17 which are: the data $x^1_{i,j}$ from the corresponding neuron (i,j) in the first layer 17; the data $x^1_{i,j-1}$ from the neuron (i,j−1) to the left of the corresponding neuron; and the data $x^1_{i,j+1}$ from the neuron (i,j+1) to the right of the corresponding neuron. In other words, the horizontal selector 22b selects three data from horizontally aligned three neurons in the first layer 17.

The multiplier 24, adder 26 and comparator 28 are the same as those described above. Thus, adder 26 produces an output $X_{i,j}$ given by the following equation (3):

$$X_{i,j}=wx^1_{i,j-1}+2wx^1_{i,j}+wx^1_{i,j+1} \tag{3}$$

and the output produced from the comparator 28, i.e., the output data $x^2_{i,j}$ from a neuron at (i,j) in the second section 18b in the second layer 18 is given by:

$$x^2_{i,j}=f(wx^1_{i,j-1}+2wx^1_{i,j}+wx^1_{i,j+1}) \tag{3'}$$

Figure 4C:
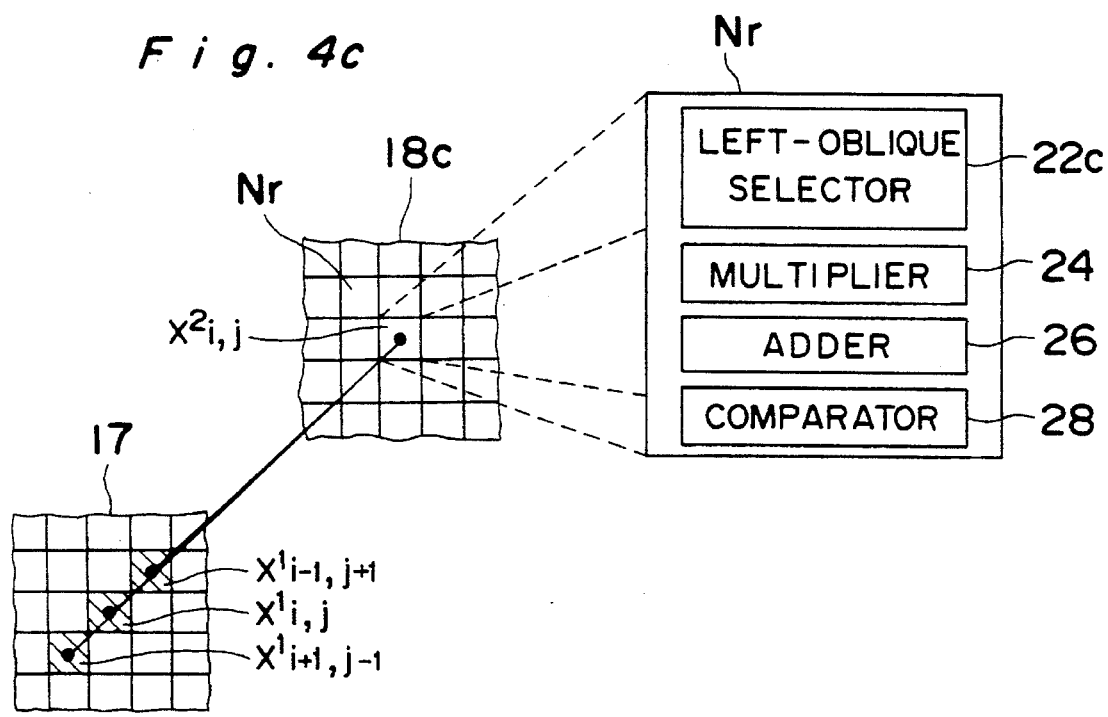

Referring to FIG. 4c, a portion of the third section 18c and a corresponding portion in the first layer 17 are shown.

Each neuron Nr in the third section 18c has a left-oblique selector 22c, a multiplier 24, an adder 26 and a comparator 28. The left-oblique selector 22c selects three data from the first layer 17 which are: the data $x^1_{i,j}$ from the corresponding neuron (i,j) in the first layer 17; the data $x^1_{i+1,j-1}$ from the neuron (i+1,j−1) on the left and below the corresponding neuron; and the data $x^1_{i-1,j+1}$ from the neuron (i−1,j+1) on the right and above the corresponding neuron. In other words, the horizontal selector 22c selects three data from the left-descending diagonally aligned three neurons in the first layer 17. contributory The multiplier 24, adder 26 and comparator 28 are the same as those described above. Thus, adder 26 produces an output $X_{i,j}$ given by the following equation (4):

$$X_{i,j}=wx^1_{i+1,j-1}+2wx^1_{i,j}+wx^1_{i-1,j+1} \tag{4}$$

and the output produced from the comparator 28, i.e., the output data $x^2_{i,j}$ from a neuron at (i,j) in the third section 18c in the second layer 18 is given by:

$$x^2_{i,j}=f(wx^1_{i+1,j-1}+2wx^1_{i,j}+wx^1_{i-1,j+1}) \tag{4'}$$

Figure 4D:
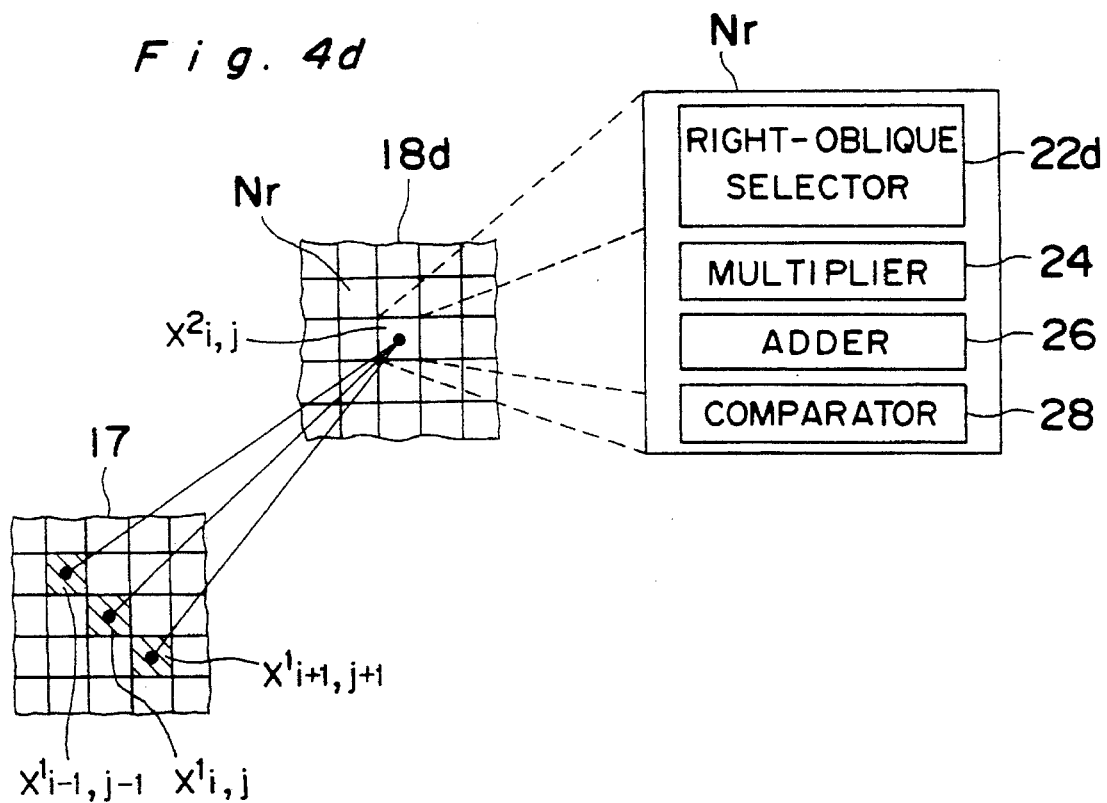

Referring to FIG. 4d, a portion of the fourth section 18d and a corresponding portion in the first layer 17 are shown.

Each neuron Nr in the fourth section 18d has a right-oblique selector 22d, a multiplier 24, an adder 26 and a comparator 28. The right-oblique selector 22d selects three data from the first layer 17 which are: the data $x^1_{i,j}$ from the corresponding neuron (i,j) in the first layer 17; the data $x^1_{i-1,j-1}$ from the neuron (i−1,j−1) on the left and above the corresponding neuron; and the data $x^1_{i+1,j+1}$ from the neuron (i+1,j+1) on the right and below the corresponding neuron. In other words, the horizontal selector 22d selects three data from the right-descending diagonally aligned three neurons in the first layer 17.

The multiplier 24, adder 26 and comparator 28 are the same as those described above. Thus, adder 26 produces an output $X_{i,j}$ given by the following equation (5)

$$X_{i,j}=wx^1_{i-1,j-1}+2wx^1_{i,j}+wx^1_{i+1,j+1} \tag{5}$$

and the output produced from the comparator 28, i.e., the output data $x^2_{i,j}$ from a neuron at (i,j) in the fourth section 18d in the second layer 18 is given by:

$$x^2_{i,j}=f(wx^1_{i-1,j-1}+2wx^1_{i,j}+wx^1_{i+1,j+1}) \tag{5'}$$

Figure 6A:
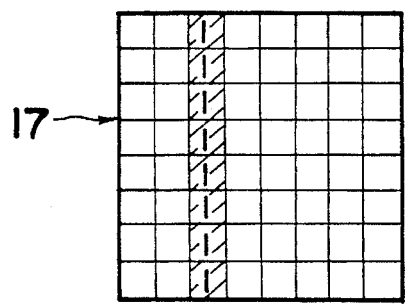
FIGS. 6a and 6b are diagrammatic views showing the first and second layers of the neural network used to describe the line component extraction principle of the present invention.

Referring to FIG. 6a, an example is shown wherein a vertical extending line is formed on the first layer 17.

Figure 6B:
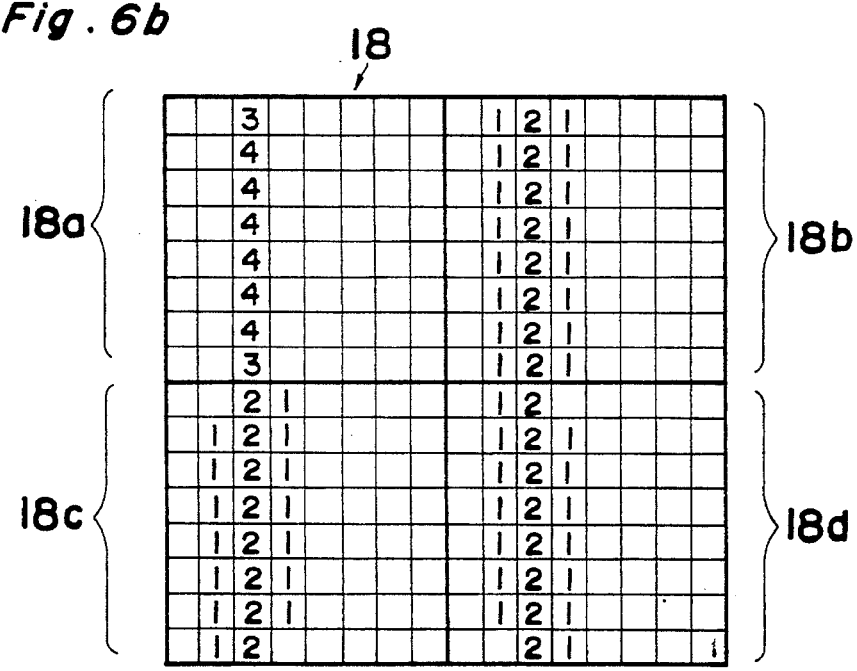

Therefore, from each of the neurons along the vertical extending line, it is assumed that output $x^1_{i,j}=$"1" is produced, and $x^1_{i,j}=$"0" is produced from the remaining neurons. If it is assumed that w=1, the calculation of equation (1) would be as follows:

$X_{1,3}=1+2=3,$ $X_{2,3}=1+2+1=4,$ $X_{3,3}=1+2+1=4,$ and so on. The calculated results are shown in FIG. 6b. The calculation of equation (3) would be as follows:

$X_{1,2}=0+0+1=1,$ $X_{1,3}=0+2+0=2,$ $X_{1,4}=1+0+0=1,$ and so on. The calculation of equation (4) would be as follows:

$X_{3,2}=0+0+1=1,$ $X_{2,3}=0+2+0=2,$ $X_{1,4}=1+0+0=1,$ and so on. The calculation of equation (5) would be as follows:

$X_{1,2}=0+1=1,$ $X_{2,3}=0+2+0=2,$ $X_{3,4}=1+0+0=1,$ and so on.

In the above example, if a threshold is set to 2.5, the comparator 28 in each neuron Nr cuts off the output data below 2.5 and produces the output data above 2.5. Thus, the output data from section 18a are produced as shown in FIG. 6b, but the output data from other sections 18b, 18c and 18d are cut off, meaning producing no data. Accordingly, the vertical line components appearing in the first layer 17 are extracted by the second layer 18. The second layer 18 may selectively extract other line components, such as horizontal, left-oblique or right-oblique line components, if such lines appear in the first layer 17. In other words, horizontal line components are extracted by the second section 18b, left-oblique diagonal line components by the third section 18c, and right-oblique diagonal line components by the fourth section 18d.

Figure 5:
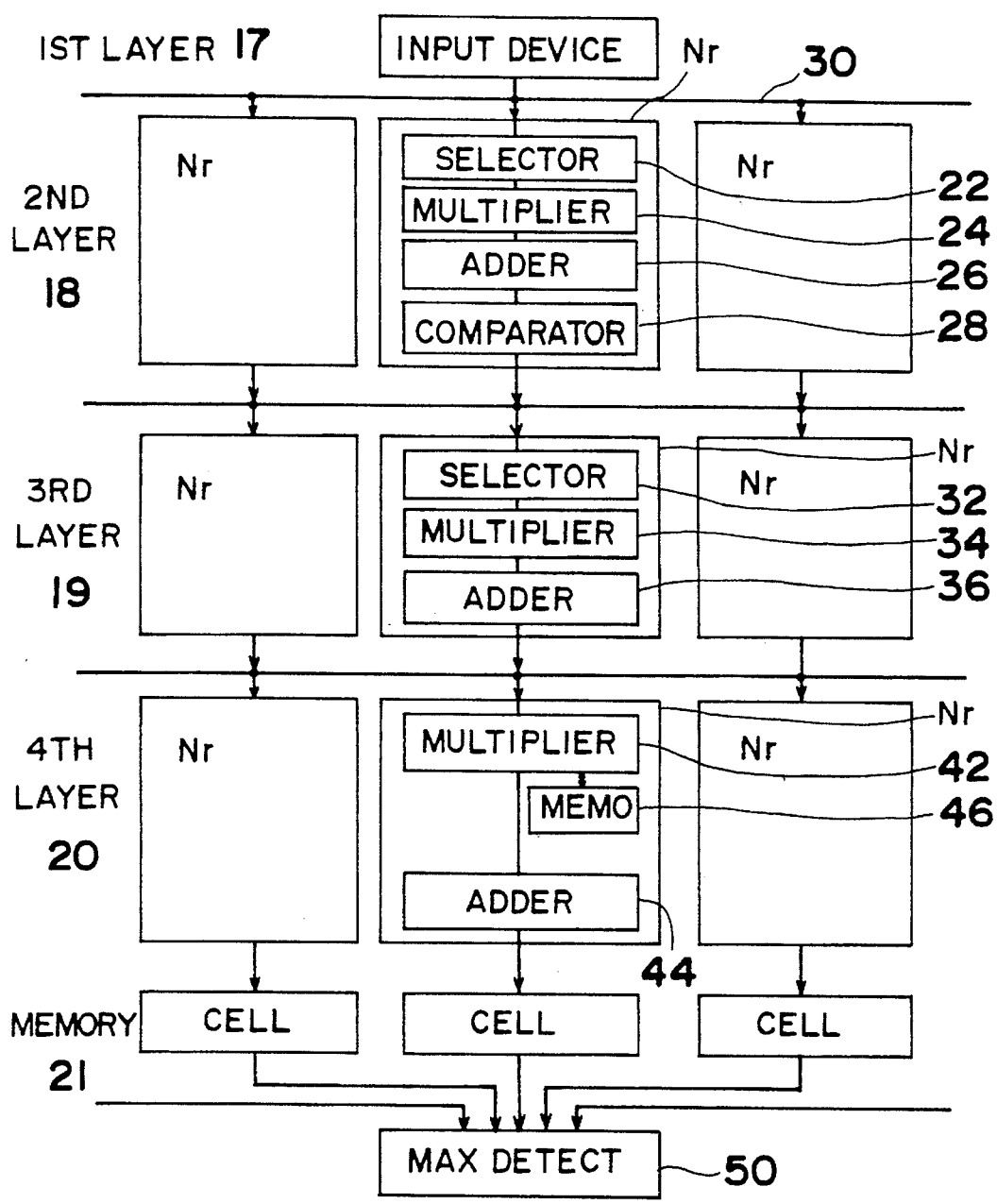
FIG. 5 is a circuit diagram showing the connections between the first, second, third and fourth layers and the memory of the neural network used in the preferred embodiment of the present invention.

As shown in FIG. 5, the second layer 18 has a plurality of neurons Nr, each neuron Nr connected to every neurons in the first layer 17 through pathways 30 called synapses. Each neuron Nr has selector 22a, 22b, 22c or 22d (generally indicated by 22), multiplier 24, adder 26 and comparator 28. By the selector 22, only the data from particular neurons in the first layer 17 are taken in each neuron Nr. The received data are processed in the above described manner to extract the line component in the image formed on the first layer 17.

Next, the description is directed to relationship between the second layer 18 and the third layer 19.

Figure 6C:
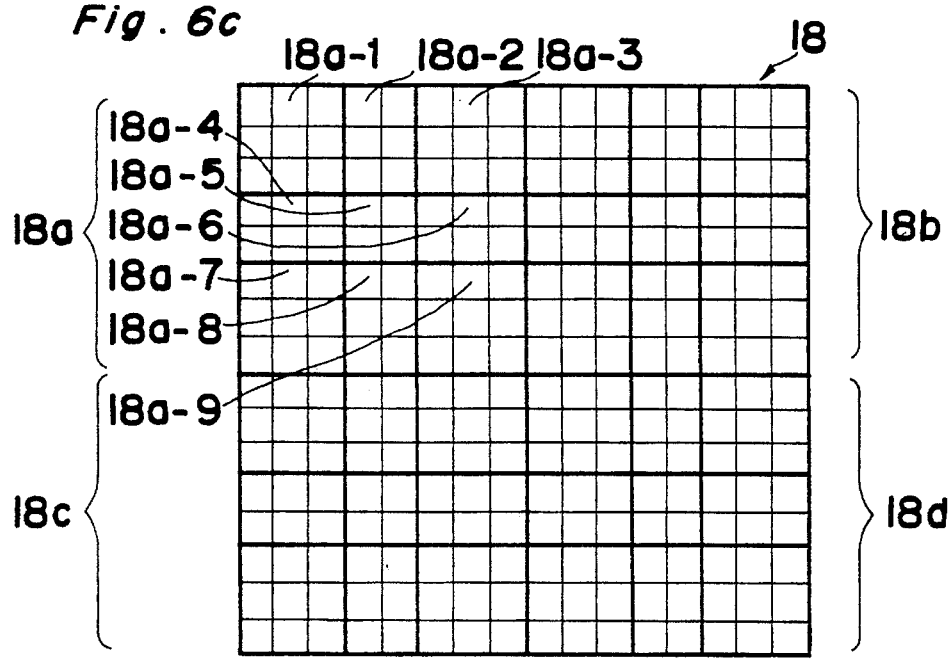
FIG. 6c is a plan view of a second layer, particularly showing subsections.

Referring to FIG. 6c, each of the sections 18a, 18b, 18c and 18d in the second layer 18 is further divided into a plurality of subsections, such as 18a-1, 18a-2, . . . , 18a-9 separated by border lines. In each of subsections 18a-1, 18a-3, 18a-7 and 18a-9, nine neurons Nr are contained. In each of subsections 18a-2, 18a-4, 18a-6 and 18a-8, six neurons Nr are contained. And in subsection 18a-5, four neurons Nr are contained. Other sections 18b, 18c and 18d in the second layer 18 are divided into subsections in a similar way. The number of neurons contained in each subsection can be selected to any other number. According to the first embodiment, in total, there are 36 subsections contained in the second layer 18.

Referring again to FIG. 1, the third layer 19 is defined by a plurality of neurons Nr aligned in two orthogonal directions. In the example shown, there are 36 neurons Nr, 6 neurons aligned horizontally, and 6 neurons aligned vertically. The number of the neurons Nr contained in the third layer 19 is equal to the number of subsections contained in the second layer 18.

The first neuron 19a-1 located at top row, left end in the third layer 19 receives data from all neurons Nr in subsection 18a-1 in the layer 18. Similarly, the second neuron 19a-2 located at top row, second from the left end in the third layer 19 receives data from all neurons Nr in subsection 18a-2. In this manner, each neuron in the third layer 19 receives data from every one of the neurons in the corresponding subsection in the second layer 18.

As shown in FIG. 5, each neuron in the third layer 19 has, a selector 32, a multiplier 34 and adder 36. The selector 32 selects data from the neurons in the corresponding subsection in the second layer; the multiplier 34 multiplies each data with a predetermined weighting called the "synapse weight"; and the adder 36 adds weighted data to obtain a sum. Then, the neuron in the third layer 19 outputs the obtained sum or the result of a non-linear increasing function using the sum of the input signals to the fourth layer 20.

Since the subsections in the second layer 18 are located at particular positions in the input image and carrying the extracted line component, the sum of the input signals to the neurons of the third layer 19 therefore corresponds to the length of the line component. Thus, the outputs from the neurons of the third layer 19 indicate where the line component is located in the input image and the length of that line component.

The fourth layer 20 comprises a plurality of, such as 26 neurons, each neuron connected to every one of the 36 neurons in the third layer 19. The 26 neurons represent alphabets A, B, C, . . . , respectively. As shown in FIG. 5, each neuron in the fourth layer 20 has a multiplier 42 coupled with a memory 46 and an adder 44. Memory 46 has 36 storing area for storing 36 different "synapse weights" for weighting the data obtained from 36 neurons in the third layer 19. The 36 different "synapse weights" as stored in memory 46 are obtained after a number of learning step. The detail of the learning method will be described later.

The adder 44 in the fourth layer 20 adds all the 36 weighted outputs from the neurons in the third layer 19 and the sum is stored in cell of a memory array 21. Thus, the memory array 21 carries 26 sums for A, B, C, . . . , X, Y, Z, respectively.

A maximum detector 50 detects the maximum data from the memory array 21, and finds the memory cell carrying the maximum sum. An alphabetic character corresponding to the detected memory cell is read out as the result of the recognition.

The learning method is the orthogonal learning method. By this method the "synapse weights" $W^n_{ij}$ (where n is the number of learning iteration; and $W_{ij}$ is a weight between i-th neuron in the third layer 19 and j-th neuron in the fourth layer 20) are obtained by the following equation (8):

$$W^{n+1}_{ij} = W^n_{ij} + \alpha(T_j - Y_j) \cdot X_i^T$$

$$Y_j = \Phi(W^n_{ij} \cdot X_i) \tag{8}$$

wherein $X_i$ (i=1, 2 . . . 36) is the output of the neurons in the third layer 19, $Y_j$ is the output of the fourth layer 20, $\alpha(>0)$ is the learning gain, $X_i^T$ is a transposed vector, $T_j$ is the target vector, and $\Phi$ is a function that normalizes the maximum value in the vector element to 1, and the other elements to 0, i.e., the output of the maximum detector 50.

As the number n increases, the synapse weight $W^n_{ij}$ is revised by equation (8).

Another improved learning method can be used. Instead of equation (8), the improved learning method uses equation (9) as given below.

$$W^{n+1}_{ij} = W^n_{ij} + \alpha(T_j - Y_j) \cdot X_i^T, \text{ when } (T_j - Y_j) > 0,$$

$$W^{n+1}_{ij} = W^n_{ij} + \beta(T_j - Y_j) \cdot X_i^T, \text{ when } (T_j - Y_j) < 0,$$

$$Y_j = \Phi(W^n_{ij} \cdot X_i) \tag{9}$$

According to the improved method the learning gain differs between when the synapse weight increases and when it decreases. For example, in the present embodiment the values $\alpha=0.7$ and $\beta=0.2$ are used.

Figure 7A:
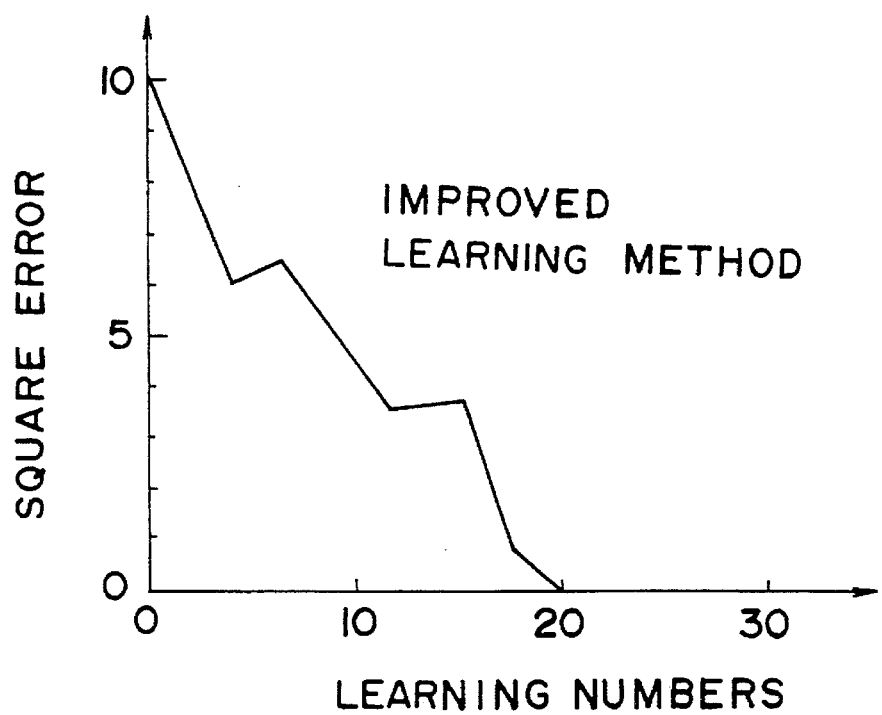
FIGS. 7a and 7b are graphs showing the relationship between the number of learning operations and the square error obtained when using the improved learning method, and that obtained when using the orthogonal learning method.
Figure 7B:
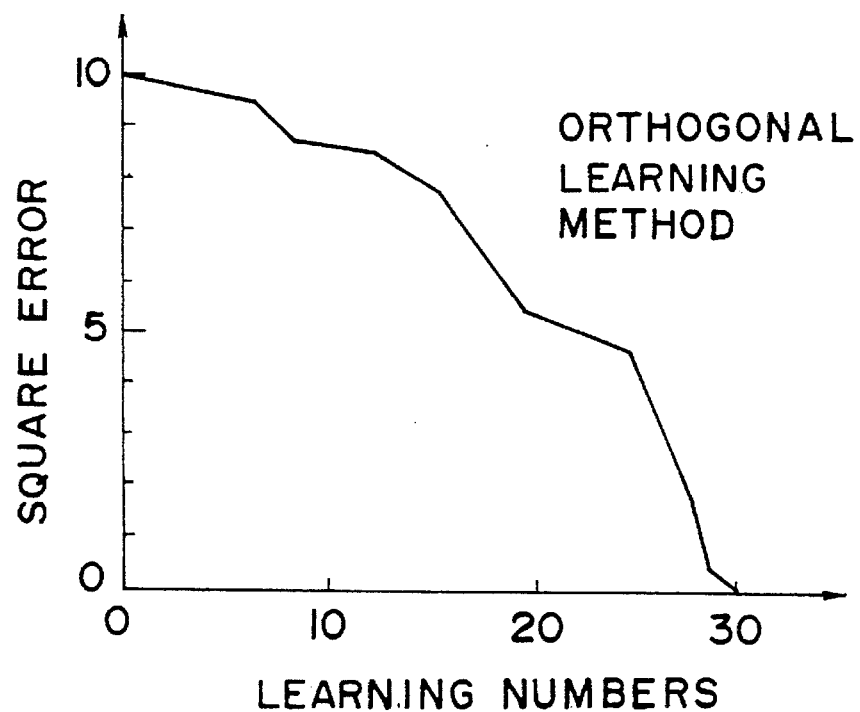

To demonstrate the difference between these two learning methods, learning tests are carried out. The test results are shown in FIGS. 7a and 7b. The learning curves of the neural network trained by the improved learning method showed about 30% less number of learning iterations to obtain the final synapse weights to be fixedly stored in the memory 46. Thus, with the improved learning method, training can be quickly completed.

Figure 8:
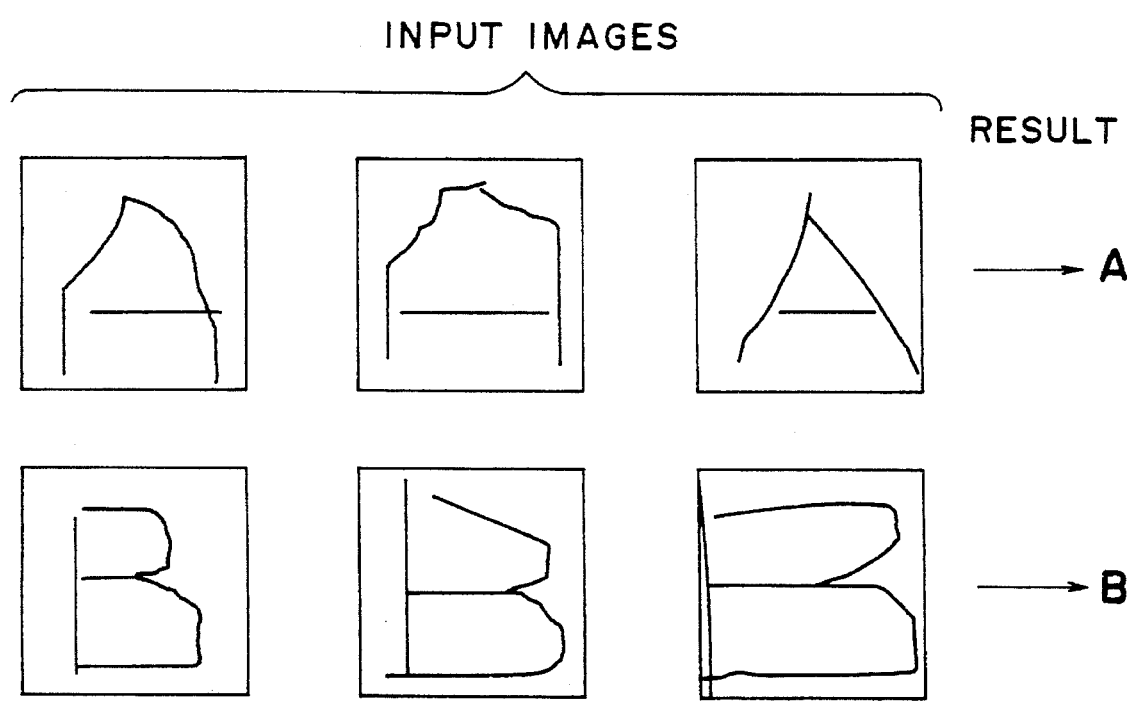
FIG. 8 is a diagram showing test results of some character distortions which the present invention can correctly recognize.

Each of the handwritten characters, such as shown in FIG. 8 can be correctly recognized by the image recognition device described above. It is confirmed that the image recognition device according to the present invention provides high recognition performance. Furthermore, the present invention and requires only a total 382 neurons in the first through fourth layers, and it can thus be simply constructed.

Second Embodiment

Figure 9:
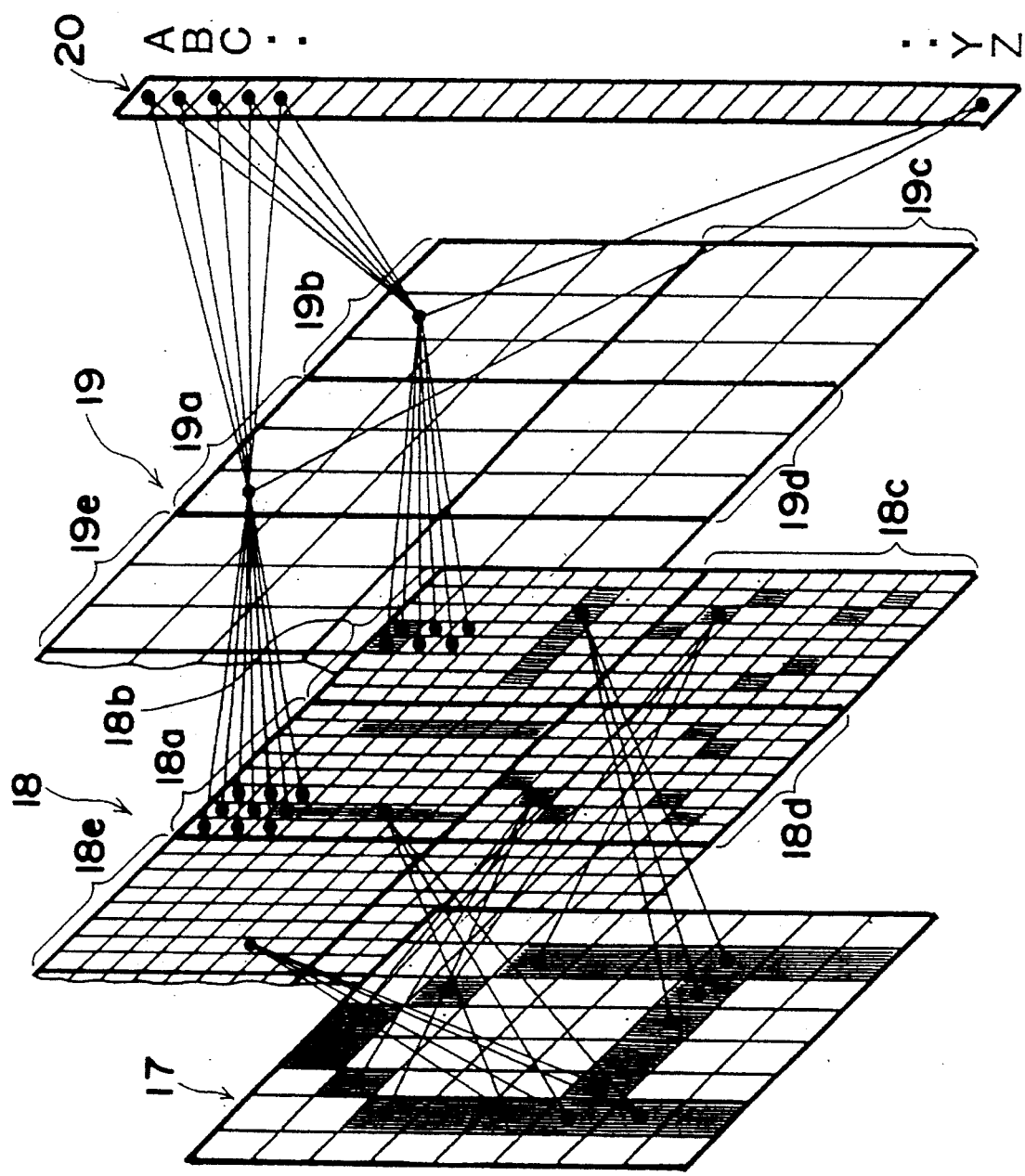
FIG. 9 is a view similar to FIG. 1, but showing an image recognition device according to a second preferred embodiment of the present invention.

Referring to FIG. 9, a second embodiment of the image recognition device according to the present invention is shown. In addition to the line components, the image recognition device of the second embodiment can further extract geometric shapes, such as "+", "T", "⊥", "⊢", "⊣", "Λ", "V", "<", ">".

In the second embodiment, the second layer 18 further has nine sections 18e, 18f, 18g, 18h, 18i, 18j, 18k, 18l and 18m, each of which has 64 neurons in a two-dimensional array of 8×8, corresponding to 8×8 neurons in the first layer 17, in addition to the sections provided in the second layer in the first embodiment. When an image is formed on the first layer 17, each newly added section receives the entire image on the first layer 17 and senses particular geometric shapes on the layer 17.

Figure 10A:
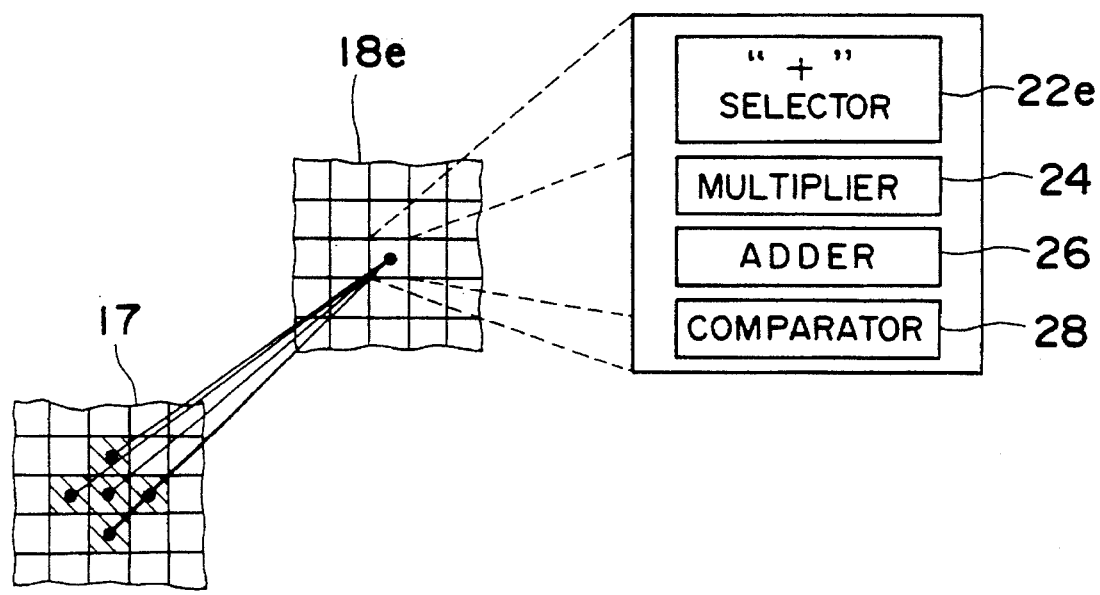
FIGS. 10a–10i are diagrams similar to FIGS. 3a–3d, but showing a portion of the first and second layers and the structure of each neuron in the second layer, according to the second embodiment.

The sections 18e, 18f, 18g, 18h, 18i, 18j, 18k, 18l and 18m are sensitive to geometric shapes "+", "T", "⊥", "⊢", "⊣", "Λ", "V", "<" and ">", respectively Referring to FIG. 10a, a portion of the section 18e and a corresponding portion in the first layer 17 are shown.

Each neuron Nr in the section 18e has a "+" selector 22e, a multiplier 24, an adder 26 and a comparator 28. The "+" selector 22a selects five data from the first layer 17 which are: data $x^1_{i,j}$, data $x^1_{x-1,j}$, data $x^1_{i+1,j}$, data $x^1_{i,j-1}$ and data $x^1_{i,j+1}$.

Figure 10B:
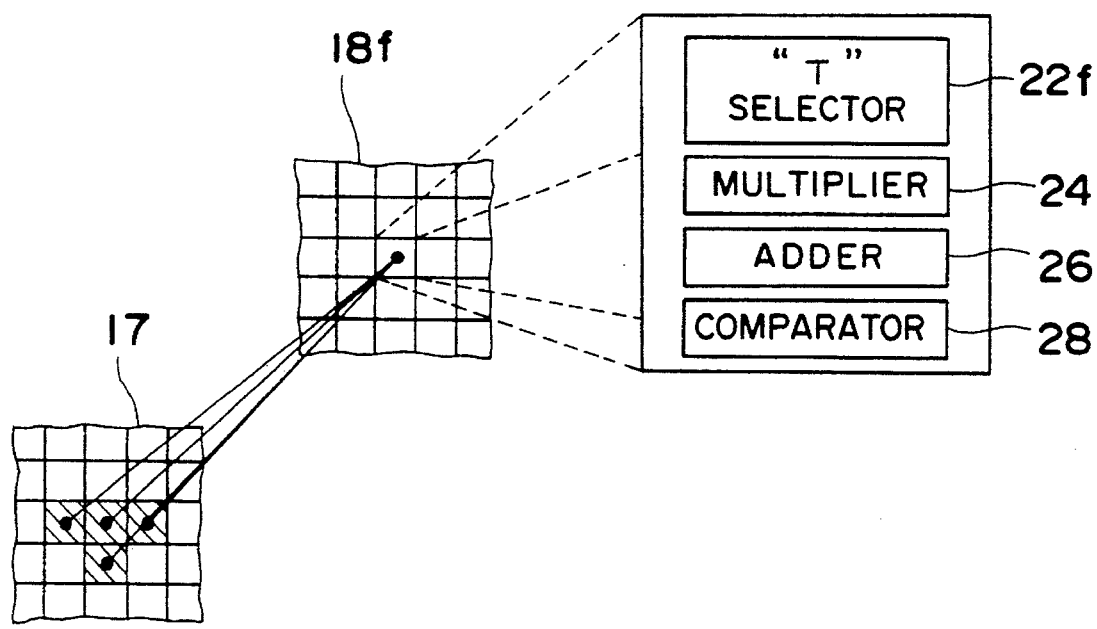

Similarly, as shown in FIG. 10b, a "T" selector 22f in section 18f selects four data which are: data $x^1_{i,j}$, data $x^1_{i+1,j}$, data $x^1_{i,j-1}$ and data $x^1_{i,j+1}$.

Figure 10C:
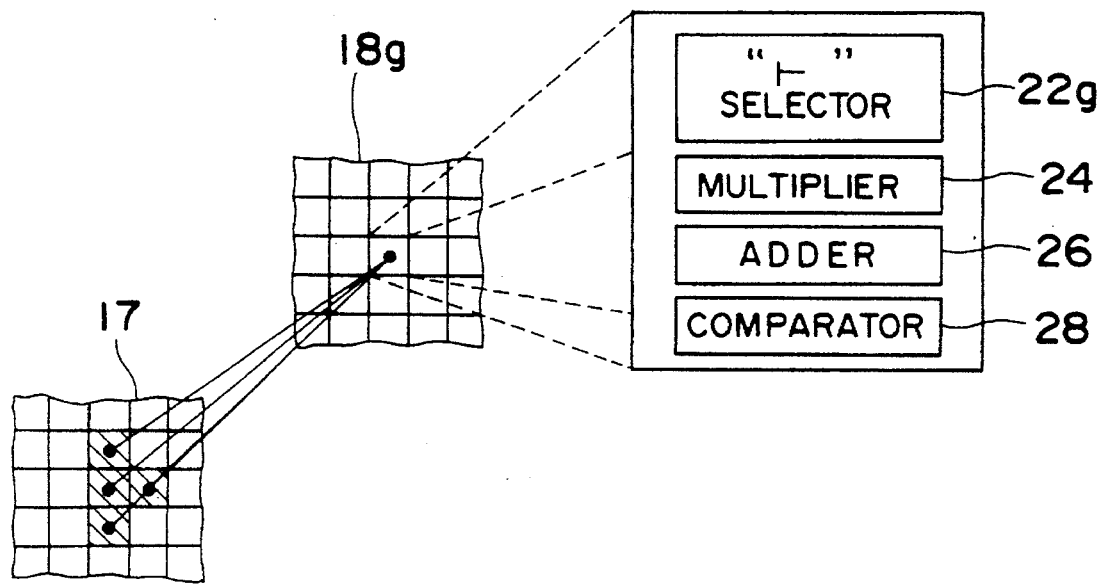

Similarly, as shown in FIG. 10c, a "⊢" selector 22g in section 18g selects four data which are: data $x^1_{i,j}$, data $x^1_{i+1,j}$, data $x^1_{i-1,j}$, and data $x^1_{i,j+1}$.

Figure 10D:
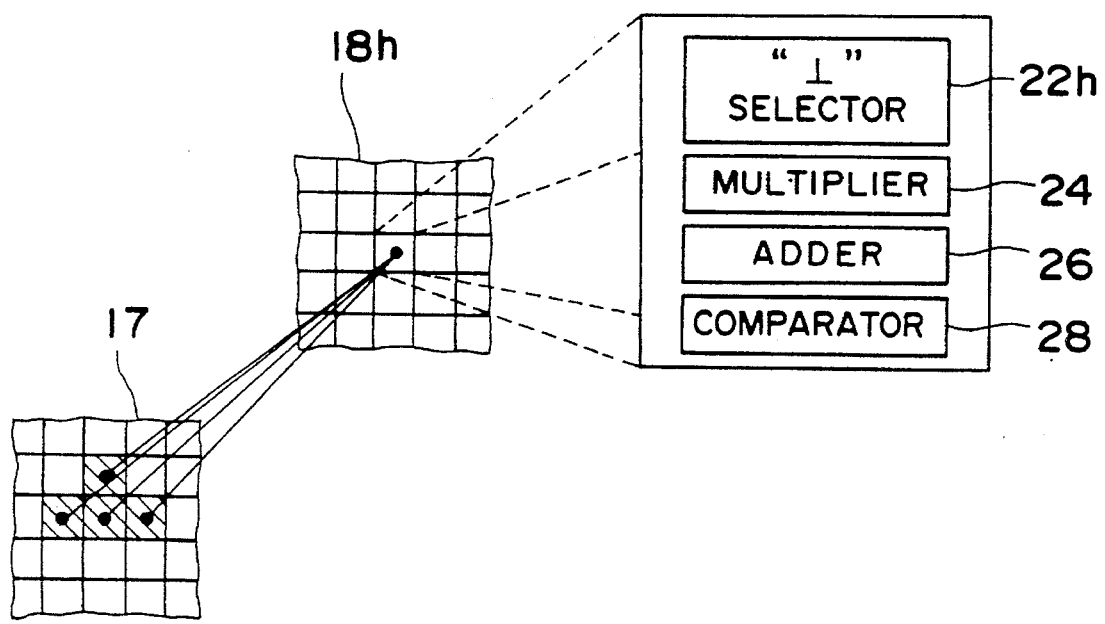

Similarly, as shown in FIG. 10d, a "⊥" selector 22h in section 18h selects four data which are: data $x^1_{i,j}$, data $x^1_{i-1,j}$, data $x^1_{i,j-1}$ and data $x^1_{i,j+1}$.

Figure 10E:
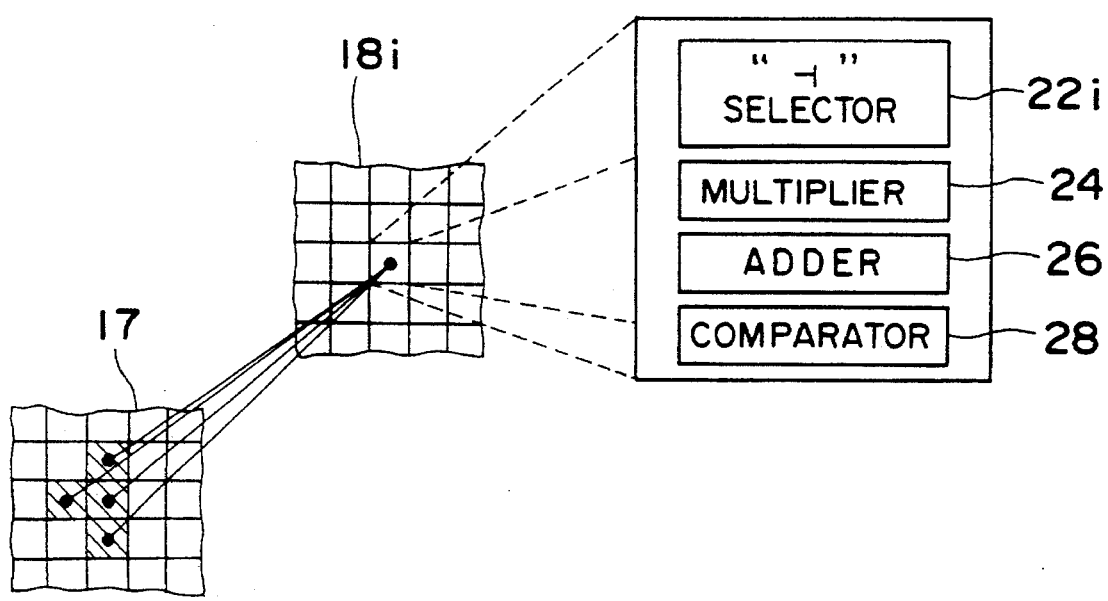

Similarly, as shown in FIG. 10e, a "⊣" selector 22i in section 18i selects four data which are: data $x^1_{i,j}$, data $x^1_{i+1,j}$, data $x^1_{i-1,j}$, and data $x^1_{i,j-1}$.

Figure 10F:
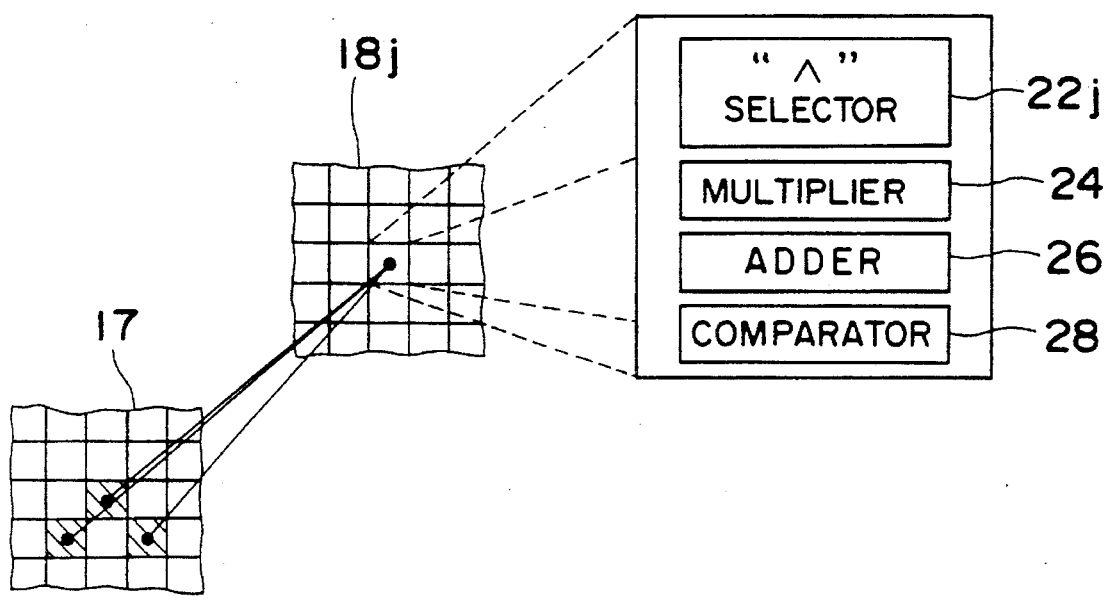

Similarly, as shown in FIG. 10f, a "Λ" selector 22j in section 18j selects three data which are: data $x^1_{i,j}$, data $x^1_{i+1,j-1}$ and $x^1_{i+1,j+1}$.

Figure 10G:
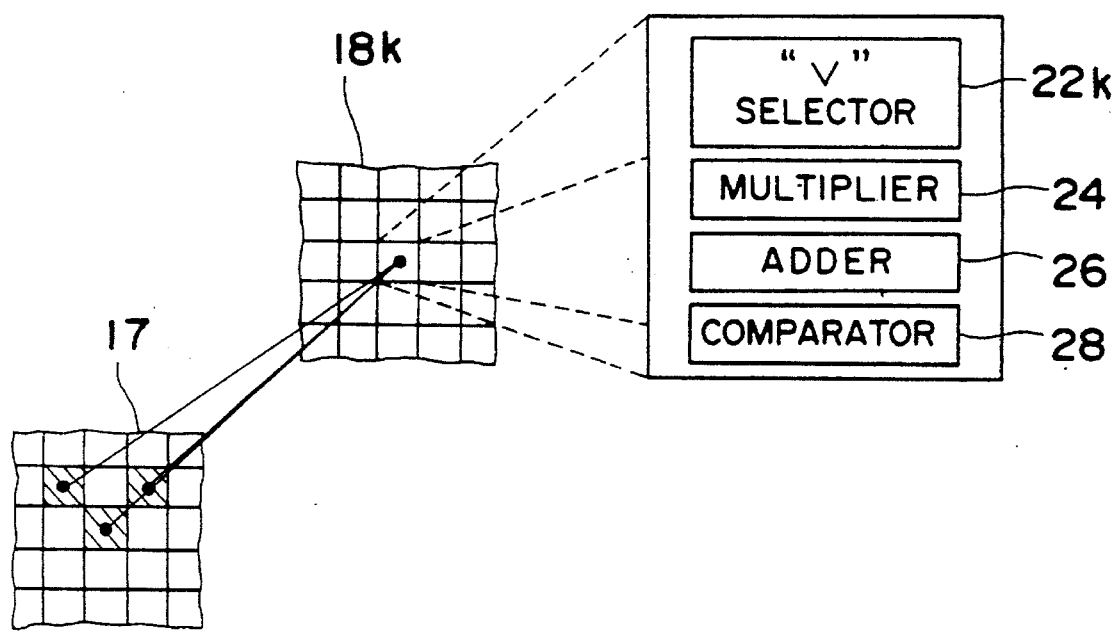

Similarly, as shown in FIG. 10g, a "V" selector 22k in section 18k selects three data which are: data $x^1_{i,j}$, data $x^1_{i-1,j-1}$ and data $x^1_{i-1,j+1}$.

Figure 10H:
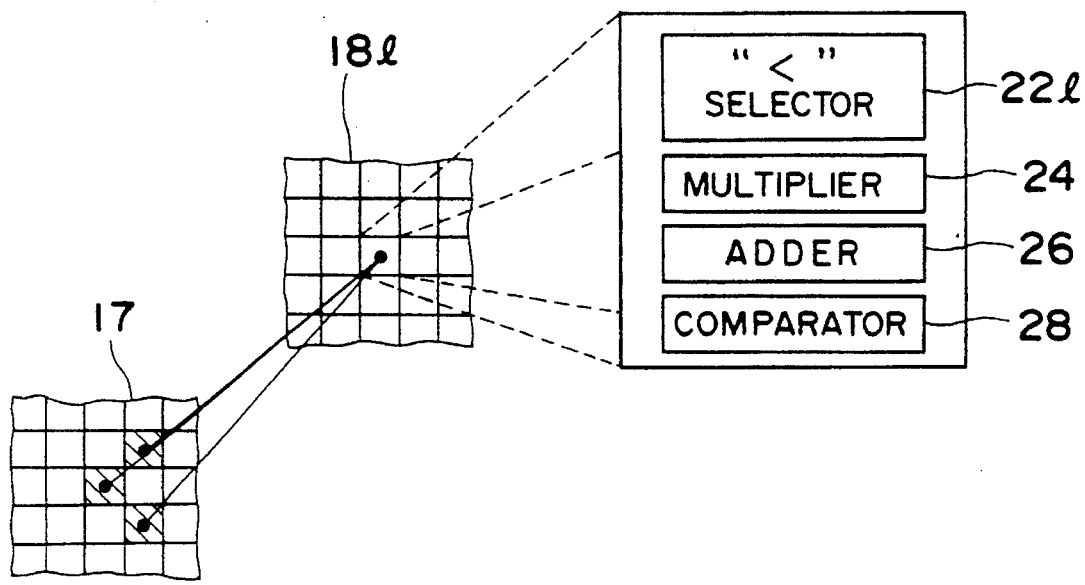

Similarly, as shown in FIG. 10h, a "<" selector 22l in section 18l selects three data which are: data $x^1_{i,j}$, data $x^1_{i-1,j+1}$ and data $x^1_{i+1,j+1}$.

Figure 10I:
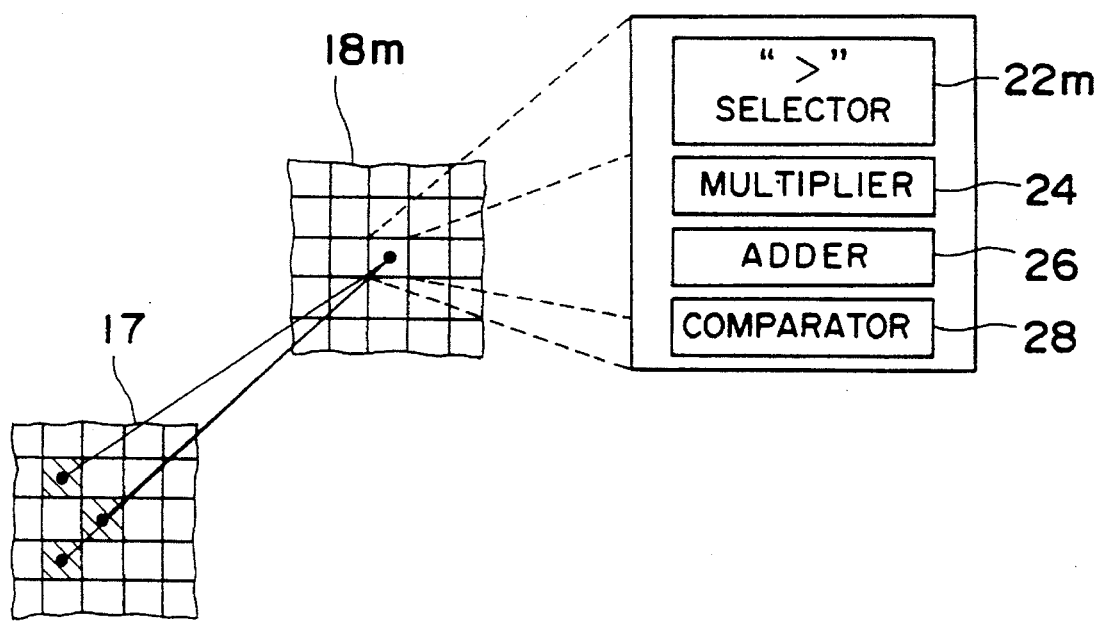
Figure 11:
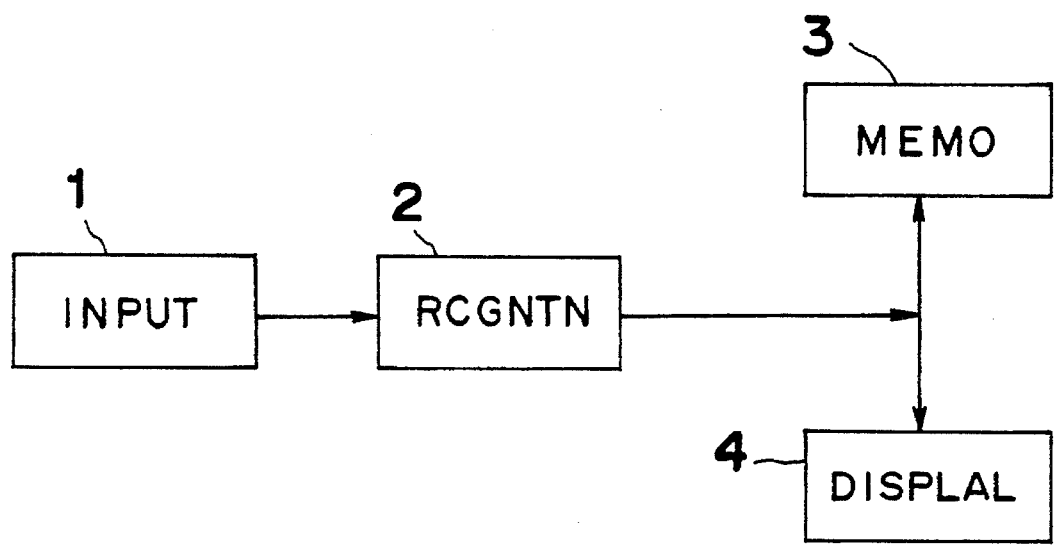
FIG. 11 is a block diagram of a prior art image recognition device.
Figure 12:
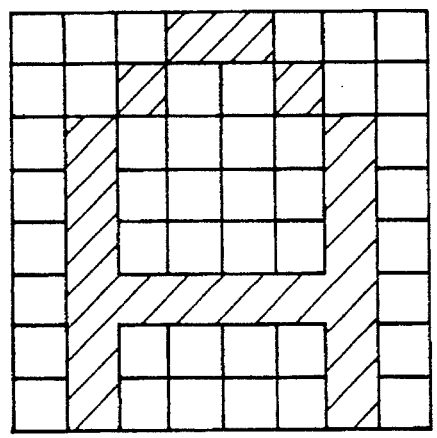
FIG. 12 is a sample bit image of a character.
Figure 13:
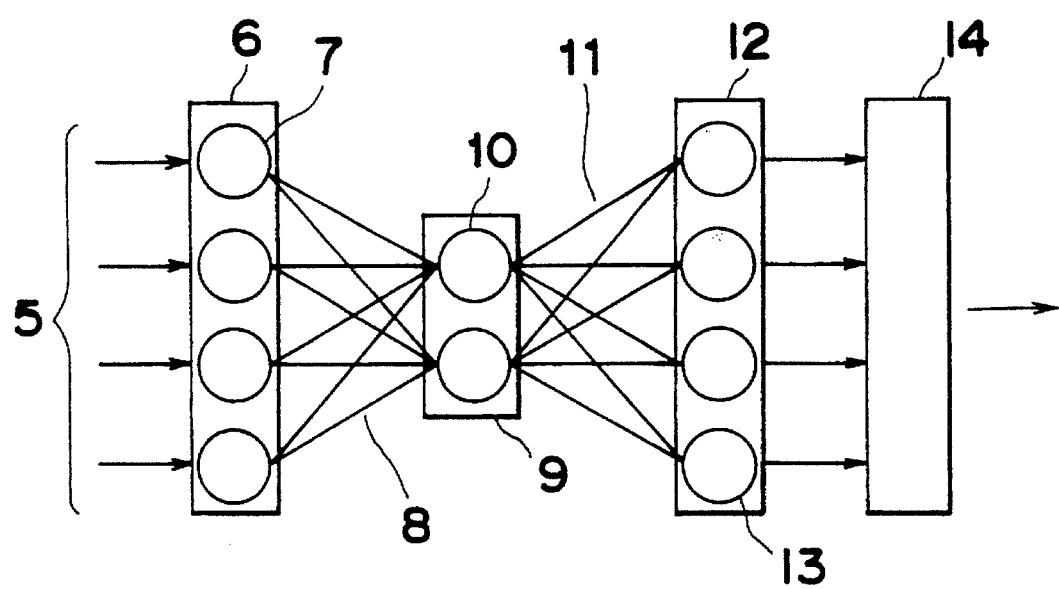
FIG. 13 is a diagram of the neural network used in the prior art image recognition device.

Similarly, as shown in FIG. 10i, a ">" selector 22m in section 18m selects three data which are: data $x^i_{i,j}$, data $x^1_{i-1,j-1}$ and data $x^1_{i+1,j-1}$.

By the use of the multiplier 24 and adder 26 provided in each neuron, the neurons in the sections 18e, 18f, 18g, 18h, 18i, 18j, 18k, 18l and 18m carries out the following calculations.

$$X_{i,j}=2wx^1_{i,j}+\{wx^1_{i,j-1}+wx^1_{i,j+1}+wx^1_{i-1,j}+wx^1_{i+1,j}\}/4 \quad (10)$$

$$X_{i,j}=2wx^1_{i,j}+\{wx^1_{i,j-1}+wx^1_{i,j+1}+wx^1_{i+1,j}\}/3 \quad (11)$$

$$X_{i,j}=2wx^1_{i,j}+\{wx^1_{i,j-1}+wx^1_{i,j+1}+wx^1_{i-1,j}\}/3 \quad (12)$$

$$X_{i,j}=2wx^1_{i,j}+\{wx^1_{i-1,j}+wx^1_{i+1,j}+wx^1_{i,j+1}\}/3 \quad (13)$$

$$X_{i,j}=2wx^1_{i,j}+\{wx^1_{i-1,j}+wx^1_{i+1,j}+wx^1_{i,j-1}\}/3 \quad (14)$$

$$X_{i,j}=2wx^1_{i,j}+\{wx^1_{i+1,j-1}+wx^1_{i+1,j+1}\}/2 \quad (15)$$

$$X_{i,j}=2wx^1_{i,j}+\{wx^1_{i-1,j-1}+wx^1_{i-1,j+1}\}/2 \quad (16)$$

$$X_{i,j}=2wx^1_{i,j}+\{wx^1_{i-1,j+1}+wx^1_{i+1,j+1}\}/2 \quad (17)$$

$$X_{i,j}=2wx^1_{i,j}+\{wx^1_{i-1,j-1}+wx^1_{i+1,j-1}\}/2 \quad (18)$$

The data obtained by the equations (10)–(18) is compared with a predetermined threshold in a comparator 28 so that the data is produced from the neuron only when the data is greater than the predetermined threshold.

According to the second embodiment, since the second layer 18 can extract various line components and various geometric shapes, the recognition device of the second embodiment is applicable for recognizing greater number of characters, such as Japanese hiragana which has 46 characters. In this case, the fourth layer should have 46 neurons.

When a recognition device of the second embodiment is used for recognizing the Japanese hiragana, a recognition rate of 99% was confirmed for unlearned characters after a learning process.

In the first embodiment, it is possible to employ only the sections 18a and 18b shown in FIGS. 4a and 4b in the case where the image to be recognized are characters formed only by vertical and horizontal line components, such as numbers drawn by eight segment lines.

As described above, a image recognition device according to the present invention yields a high recognition rate even with distorted and offset images because the neural network of the second and third layers extract the type, position, and weight of presence of the line components or geometric shapes contained in the input image.

Furthermore, training of the neural network in the recognition device of the present invention can be completed quickly because the present neural network can extract features which are hardly affected by the deformation of input patterns.

Also, the image recognition device according to the present invention can remove noise in the image and yields a high recognition rate because the image input to the image recognition device is divided into finite regions and threshold processing is applied to each neuron to obtain the input signal for the neural network.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image recognition device for recognizing an input image by a neural network system, comprising:

input means for inputting an image;

a first layer having a plurality of neurons aligned in a plane for receiving said image on said first layer;

a second layer having a line component sensitive section divided into subsections, each of which contains a plurality of line sensing neurons:

(1) each sensitive to line components of said image extending in a single direction, and (2) comprising:

(i) receiving means for receiving signals from at least three neurons in said first layer, said three neurons from which signals are received being aligned only in said single direction, (ii) multiplier means for multiplying predetermined non-negative synapse weights by the signals received from said at least three neurons, respectively, to produce at least three non-negative products, (iii) adder means for adding said products to produce a sum, and (iv) comparator means for comparing said sum with a predetermined threshold, and for producing no output signal when said sum is less than said predetermined threshold and producing an output signal relative to said sum when said sum is greater than said predetermined threshold;

a third layer having a plurality of neurons, each sensitive to a group of neurons contained in said subsections;

a fourth layer having a plurality of neurons, each sensitive to all said neurons in third layer; and a maximum detecting means for detecting a maximum from said neurons in said fourth layer.

2. An image recognition device for recognizing an input image by a neural network system, comprising:

input means for inputting an image;

a first layer having a plurality of neurons aligned in a plane for receiving said image on said first layer;

a second layer having:

(1) a first line component sensitive section divided into subsections each of which contains a plurality of first neurons, each sensitive to vertical line components of said image, (2) a second line component sensitive section divided into subsections each of which contains a plurality of second neurons, each sensitive to horizontal line components of said image, (3) a third line component sensitive section divided into subsections each of which contains a plurality of third neurons each sensitive to left-oblique line components of said image, and (4) a fourth line component sensitive section divided into subsections each of which contains a plurality of fourth neurons each sensitive to right-oblique line components of said image, each of said first, second, third and fourth neurons having:
   (i) receiving means for receiving signals from at least three neurons in said first layer, said three neurons from which signals are received being aligned in only a direction corresponding to the direction for which the neuron in the line component sensitive section of said second layer is assigned,
   (ii) multiplier means for multiplying predetermined non-negative synapse weights by the signals obtained from said at least three neurons, respectively, to produce at least three non-negative products,
   (iii) adder means for adding said products to produce a sum, and
   (iv) comparator means for comparing said sum with a predetermined threshold, and for producing no output signal when said sum is less than said predetermined threshold and producing an output signal relative to said sum when said sum is greater than said predetermined threshold;

a third layer having a plurality of neurons, each sensitive to a group of neurons contained in said subsections;

a fourth layer having a plurality of neurons, each sensitive to all the neurons in said third layer; and a maximum detecting means for detecting a maximum output from said neurons in said fourth layer.

3. An image recognition device for recognizing an input image by a neural network system, comprising:

input means for inputting an image;

a first layer having a plurality of neurons aligned in a plane for receiving said image on said first layer;

a second layer having a geometric shape sensitive section divided into subsections, each of which contains a plurality of geometric sensing neurons:

(1) each sensitive to a particular geometric shape in said image, and (2) comprising:
   (i) receiving means for receiving signals from at least three neurons in said first layer, said three neurons from which signals are received being aligned only in said particular geometric shape,
   (ii) multiplier means for multiplying predetermined non-negative synapse weights by the signals obtained from said at least three neurons, respectively, to produce at least three non-negative products,
   (iii) adder means for adding said products to produce a sum, and
   (iv) comparator means for comparing said sum with a predetermined threshold, and for producing no output signal said sum is less than said predetermined threshold and producing an output signal relative to said sum when said sum is greater than said predetermined threshold.

a third layer having a plurality of neurons, each sensitive to a group of neurons contained in said subsections;

a fourth layer having a plurality of neurons, each sensitive to all said neurons in said third layer; and a maximum detecting means for detecting a maximum output from said neurons in said fourth layer.

4. An image recognition device as claimed in claim 3, wherein said geometric sensing neurons are "+" sensing neurons, and wherein said receiver means receives signals from five neurons in said first layer aligned such that three neurons are aligned horizontally, one neuron is positioned above the center neuron of the three and another one neuron is positioned below the center neuron.

5. An image recognition device as claimed in claim 3, wherein said geometric sensing neurons are "T" sensing neurons, and wherein said receiver means receives signals from four neurons in said first layer aligned such that three neurons are aligned horizontally, one neuron is positioned below the center neuron of the three.

6. An image recognition device as claimed in claim 3, wherein said geometric sensing neurons are "⊥" sensing neurons, and wherein said receiver means receives signals from four neurons in said first layer aligned such that three neurons are aligned horizontally and one neuron is positioned above the center neuron of the three.

7. An image recognition device as claimed in claim 5, wherein said geometric sensing neurons are "⊢" sensing neurons, and wherein said receiver means receives signals from four neurons in said first layer aligned such that three neurons are aligned vertically and one neuron is positioned on the right of the center neuron of the three.

8. An image recognition device as claimed in claim 3, wherein said geometric sensing neurons are "⊣" sensing neurons, and wherein said receiver means receives signals from four neurons in said first layer aligned such that three neurons are aligned vertically and one neuron is positioned on the left of the center neuron of the three.

9. An image recognition device as claimed in claim 3, wherein said geometric sensing neurons are "Λ" sensing neurons, and wherein said receiver means receives signals from three neurons in said first layer aligned such that two neurons are aligned horizontally with one neuron space held therebetween and one neuron is positioned above the space.

10. An image recognition device as claimed in claim 3, wherein said geometric sensing neurons are "V" sensing neurons, and wherein said receiver means receives signals for three neurons in said first layer aligned such that two neurons are aligned horizontally with one neuron space held therebetween and one neuron is positioned below the space.

11. An image recognition device as claimed in claim 3, wherein said geometric sensing neurons are "<" sensing neurons, and wherein said receiver means receives signals from three neurons in said first layer aligned such that two neurons are aligned vertically with one neuron space held therebetween and one neuron is positioned on the left of the space.

12. An image recognition device as claimed in claim 3, wherein said geometric sensing neurons are ">" sensing neurons, and wherein said receiver means receives signals from three neurons in said first layer aligned such that two neurons are aligned vertically with one neuron space held therebetween and one neuron is positioned on the right of the space.

13. An image recognition device as claimed in claim 1, wherein each of said neurons in said third layer comprises:
   selector means for selecting said group of neurons in said second layer;
   multiplier means for multiplying predetermined synapse weights by output signals obtained from said group of neurons to produce products, respectively; and
   adder means for adding said products to produce a sum.

14. An image recognition device as claimed in claim 1, wherein each of said neurons in said fourth layer comprises:
   multiplier means for multiplying learned synapse weights by output signals obtained from said group of neurons to produce products, respectively;
   memory means for storing learned synapse weights; and
   adder means for adding said products to produce a sum.

* * * * *

UNITED STATES PATENT AND TRADEMARK OFFICE
CERTIFICATE OF CORRECTION

PATENT NO. : 5,511,134
DATED : April 23, 1996
INVENTOR(S) : Kuratomi et al.

It is certified that error appears in the above-indentified patent and that said Letters Patent is hereby corrected as shown below:

Column 12, line 54, between "in" and "third" insert --said--.

Column 13, line 64, between "signal" and "said" insert --when--.

Column 13, line 67, after the word "threshold" delete the period "." and insert a semicolon --;--.

Column 14, line 29, delete "5" and insert --3--.

Column 14, line 52, delete "for" and insert --from--.

Signed and Sealed this

Twenty-ninth Day of October 1996

Attest:

BRUCE LEHMAN

*Attesting Officer*     *Commissioner of Patents and Trademarks*

UNITED STATES PATENT AND TRADE MARK OFFICE
CERTIFICATE OF CORRECTION

PATENT NO. : 5,511,134
DATED : April 23, 1996
INVENTOR(S) : Kuratomi et al.

It is certified that error appears in the above-identified patent and that said Letters Patent is hereby corrected as shown below:

In column 1, line 39, delete "10".
Col. 1, line 39, insert "10" before comprising
In column 3, line 31, "$0 \leq x \leq 3w$" should be changed to --$0 \leq x < 3w$--.

In column 7, line 28, "horizontal" should be changed to --left oblique--.

In column 7, line 52, "horizontal" should be changed to --right oblique--.

In column 10, line 66, "$x^1_{x-1,j}$" should be changed to --$x^1_{i-1,j}$--.

In column 11, line 34, in equation (12), change "$wx^1_{i,j-1}$" to --$wx^1_{i+1,j}$--.

In column 11, line 36, in equation (13) change "$wx^1_{i+1,j}$" to --$wx^1_{i,j-1}$--.

In column 14, line 29 (Claim 7, line 1) change "claim 5" to --claim 3--.

Signed and Sealed this

First Day of April, 1997

BRUCE LEHMAN

*Attest:*

*Attesting Officer*   Commissioner of Patents and Trademarks